UNITED STATES PATENT OFFICE.

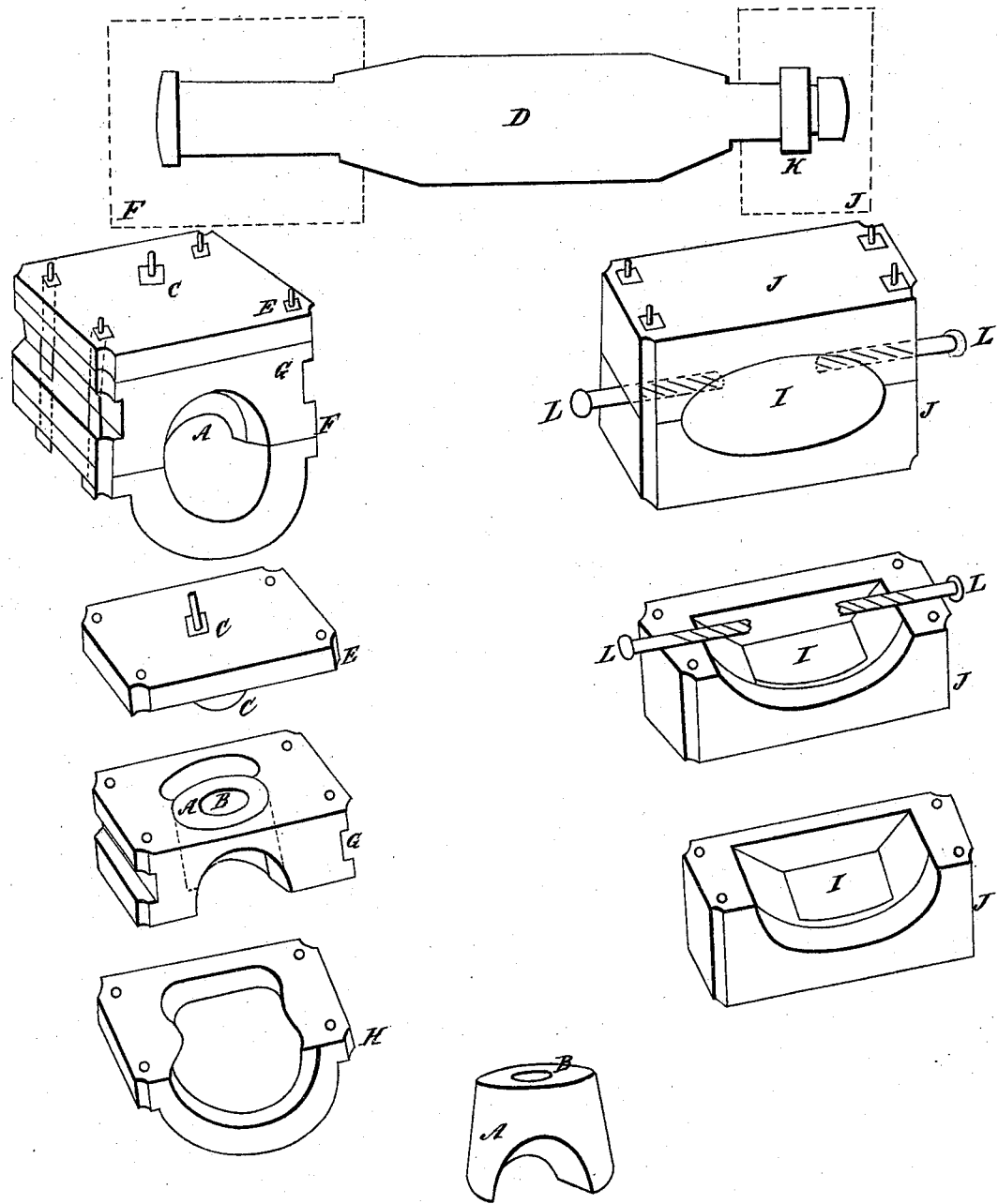

W. B. FAHNESTOCK, OF LANCASTER, PENNSYLVANIA.

AXLE-BOX.

Specification of Letters Patent No. 19,762, dated March 30, 1858.

*To all whom it may concern:*

Be it known that I, WILLIAM B. FAHNESTOCK, of Lancaster city, county of Lancaster, and State of Pennsylvania, have invented new and useful Improvements in Boxes for Car and Carriage Axles; and I do hereby declare that the following is a full and exact description thereof, reference being had to the accompanying drawings, and to the letters of reference marked thereon, making a part of this specification.

To enable others skilled in the art to make and use my invention, I will proceed to describe its construction and operation.

The object of my improvements is that the ends of the axle revolve at the same time that they describe the necessary arc of a circle, thereby giving the wheel perfect freedom to follow the line of the rail, and consequently preventing the sliding and friction of the wheels on or against the rails.

The bearing A is made of brass or other metal; is circular in shape, tapering slightly toward the top, with a concavity B in the top, in which a pivot C rests, and is concave below, half the depth of the axle D to receive the axle, and allow it to turn with the line of the rail. The pivot C is either cast solid with the top plate E of the box F, or made separate from the box, of wrought iron with a nut and screw, for the purpose of attaching it to the frame of the truck. It is square where it passes through the upper plate E to prevent its turning. The center or middle part G of the box E is shaped to receive the bearing A and allow the axle to play. The lower part H of box E is shaped so as to allow the axle to play at the same time that there is space enough for holding the oil and sponge to lubricate the axle. The opposite end of axle D operates in a slot I in the box J, and describes the necessary arc of a circle according to the curve of the rail, at the same time that it revolves in a movable brass ring K fitted to its end to prevent friction.

L are set screws in the box J which are to diminish or increase the space on each side of the axle so as to adapt it to any degree of curve.

What I claim as my invention and desire to secure by Letters Patent is—

The combination of the axle and boxes arranged and constructed as herein described, for the purpose of allowing the axle to turn and accommodate the wheel to the direction of the rail.

WM. B. FAHNESTOCK.

Witnesses:
   I. FRANKLIN REIGART,
   M. CARPENTER.